(12) United States Patent
Lang et al.

(10) Patent No.: US 9,269,105 B2
(45) Date of Patent: *Feb. 23, 2016

(54) IMAGE PROCESSING

(71) Applicant: Sony Europe Limited, Weybridge (GB)

(72) Inventors: Mikael Carl Lang, Surrey (GB); Robert Mark Stefan Porter, Hampshire (GB); Paul Edward Prayle, Hampshire (GB); Ratna Beresford, Hampshire (GB); Jonathan Richard Thorpe, Hampshire (GB); Michael John Williams, Hampshire (GB)

(73) Assignee: SONY EUROPE LIMITED, Weybridge (GB)

( * ) Notice: Subject to any disclaimer, the term of this patent is extended or adjusted under 35 U.S.C. 154(b) by 385 days.

This patent is subject to a terminal disclaimer.

(21) Appl. No.: 13/776,061

(22) Filed: Feb. 25, 2013

(65) Prior Publication Data

US 2013/0173420 A1 Jul. 4, 2013

Related U.S. Application Data

(63) Continuation of application No. 12/092,090, filed as application No. PCT/GB2006/003625 on Sep. 29, 2006, now Pat. No. 8,385,646.

(30) Foreign Application Priority Data

Oct. 31, 2005 (GB) .................................. 0522157.7

(51) Int. Cl.
*G06Q 30/06* (2012.01)
*G06F 17/30* (2006.01)
(Continued)

(52) U.S. Cl.
CPC ........ *G06Q 30/0631* (2013.01); *G06F 17/3025* (2013.01); *G06F 17/30799* (2013.01);
(Continued)

(58) Field of Classification Search
USPC ......... 382/117–118, 305, 165; 705/26.1–27.2
See application file for complete search history.

(56) References Cited

U.S. PATENT DOCUMENTS 6,373,979 B1 4/2002 Wang
6,594,386 B1 7/2003 Golshani et al.
(Continued)

FOREIGN PATENT DOCUMENTS

| EP | 0 866 409 | 9/1998 |
|---|---|---|
| EP | 1 246 085 | 10/2002 |
| EP | 1 293 925 | 3/2003 |
| EP | 1 564 660 | 8/2005 |
| GB | 2 414 616 | 11/2005 |

OTHER PUBLICATIONS

Carson et al., "Blobworld: Image Segmentation Using Expectation-Maximization and its Application to Image Querying," IEEE Transactions on Pattern Analysis and Machine Intelligence, vol. 24, No. 8, pp. 1026-1038, XP001144033, 2002.

(Continued)

*Primary Examiner* — Ishrat I Sherali
(74) *Attorney, Agent, or Firm* — Oblon, McClelland, Maier & Neustadt, L.L.P.

(57) ABSTRACT

An image processing method includes partitioning an image under test to form a plurality of contiguous image segments having similar image properties, deriving feature data from a subset including one or more of the image segments, and comparing the feature data from the subset of image segments with feature data derived from respective image segments of one or more other images so as to detect a similarity between the image under test and the one or more other images.

19 Claims, 13 Drawing Sheets

Figure 1:
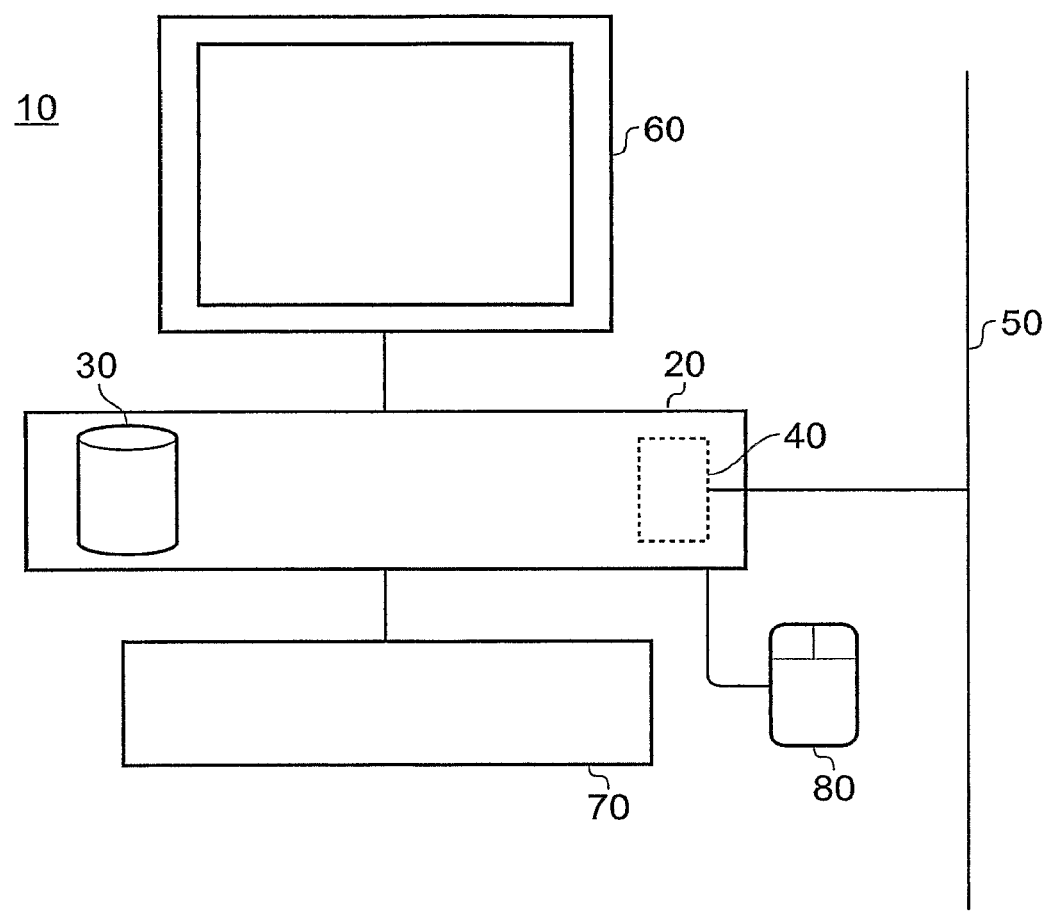

(51) Int. Cl.
*G06K 9/46* (2006.01)
*G06T 7/00* (2006.01)
*G06T 7/40* (2006.01)
*G06K 9/00* (2006.01)

(52) U.S. Cl.
CPC ...... *G06F17/30831* (2013.01); *G06K 9/00536* (2013.01); *G06K 9/4638* (2013.01); *G06K 9/4652* (2013.01); *G06T 7/0083* (2013.01); *G06T 7/0087* (2013.01); *G06T 7/404* (2013.01); *G06T 2207/10016* (2013.01)

(56) References Cited

U.S. PATENT DOCUMENTS

| | | | |
|---|---|---|---|
| 7,016,532 | B2 | 3/2006 | Boncyk et al. |
| 7,477,780 | B2 * | 1/2009 | Boncyk et al. ................. 382/165 |
| 8,385,646 | B2 * | 2/2013 | Lang et al. .................... 382/173 |
| 8,990,235 | B2 * | 3/2015 | King et al. .................... 707/759 |

OTHER PUBLICATIONS

Yeh et al., "A Picture is Worth a Thousand Keywords: Image-Based Object Search on a Mobile Platform," CHI 2005, Conference Proceedings, Human Factors in Computing Systems, pp. 1-4, XP 007901619, 2005.

Byun et al., "FRIP: A Region-Based Image Retrieval Tool Using Automatic Image Segmentation and Stepwise Boolean and Matching," IEEE Transactions on Multimedia, vol. 7, No. 1, pp. 105-113, XP 011125467, 2005.

Kettaf et al., "A Comparison Study of Image Segmentation by Clustering Techniques," Proceedings of ICSP, vol. 2, pp. 1280-1283, XP 010209419, 1996.

Valkealahti et al., "Reduced Multidimensional Histograms in Color Texture Description," Pattern Recognition, Proceedings of Fourteenth International Conference on Brisbane, vol. 2, pp. 1057-1061, XP 010297694, 1998.

* cited by examiner

IMAGE PROCESSING

CROSS-REFERENCE TO RELATED APPLICATIONS

This application is a continuation application of and claims the benefit of priority under 35 U.S.C. §120 from U.S. application Ser. No. 12/092,090, filed Oct. 7, 2008, the entire contents of which is incorporated herein by reference. U.S. application Ser. No. 12/092,090 is a national stage of international application PCT/GB06/03625, filed Sep. 29, 2006, which is based upon and claims the benefit of priority under 35 U.S.C. §119 from British Patent Application No. 0522157.7, filed Oct. 31, 2005.

This invention relates to image processing.

Techniques have been derived for indexing and searching textual information items, or at least items having some textual content. An example of such a technique is to generate feature data from the textual item (e.g. word distribution) and to allow comparisons between items to be made on the basis of a comparison of the feature data.

With image items, however, few useful techniques have been proposed.

One simple technique is to associate some text with an image. This could be as simple as a title, or could involve more detailed "metadata" such as a paragraph of description, a schedule of items or people in the image, a time of capture of the image, a schedule of those involved in its capture, and so on. Text-based searching techniques can then be used to identify similar images. But of course, providing accurate and useful metadata is time-consuming and expensive.

Other techniques establish feature data based on properties of the images themselves. These might include colour properties, texture properties and the like. But this is also limited because two images, which to a human observer represent the same thing, may have very different image properties. For example, a pair of images of a particular person might have very different image properties because the image backgrounds are different.

This invention provides an image processing method comprising the steps of:

partitioning an image under test to form a plurality of image segments, each segment representing a set of pixels having similar image properties, at least some segments being contiguous;

deriving feature data from a subset comprising one or more of the image segments; and comparing the feature data from the subset of image segments with feature data indicative of respective reference image segments so as to detect a degree of similarity between the image segments under test and the reference image segments.

The invention addresses the above problems by first partitioning an image into segments (regions, areas etc) having similar image properties, and then establishing feature data from the individual segments for comparison with other reference segments, for example segments in that or another image or even artificially created segments which are generically representative of image portions. This can act to reduce the variability introduced by parts of the image which are not of interest to the present comparison.

In another aspect the invention also provides an image processing method comprising the steps of:

partitioning an image under test to form a plurality of image segments, each segment representing a set of pixels having similar image properties, at least some being contiguous, the partitioning step comprising:

(i) deriving image property data from pixels of the image under test;

(ii) grouping pixels into image segments in accordance with their respective image property data.

Sub-features of other aspects of the invention are applicable to this aspect.

Further respective aspects and features of the invention are defined in the appended claims.

Figure 2A:
Figure 2B:
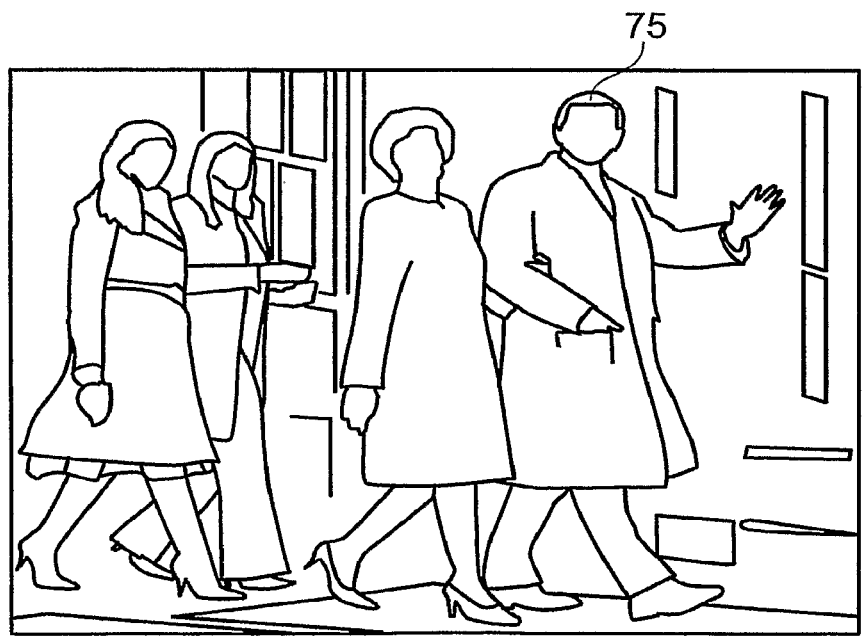
Figure 3:
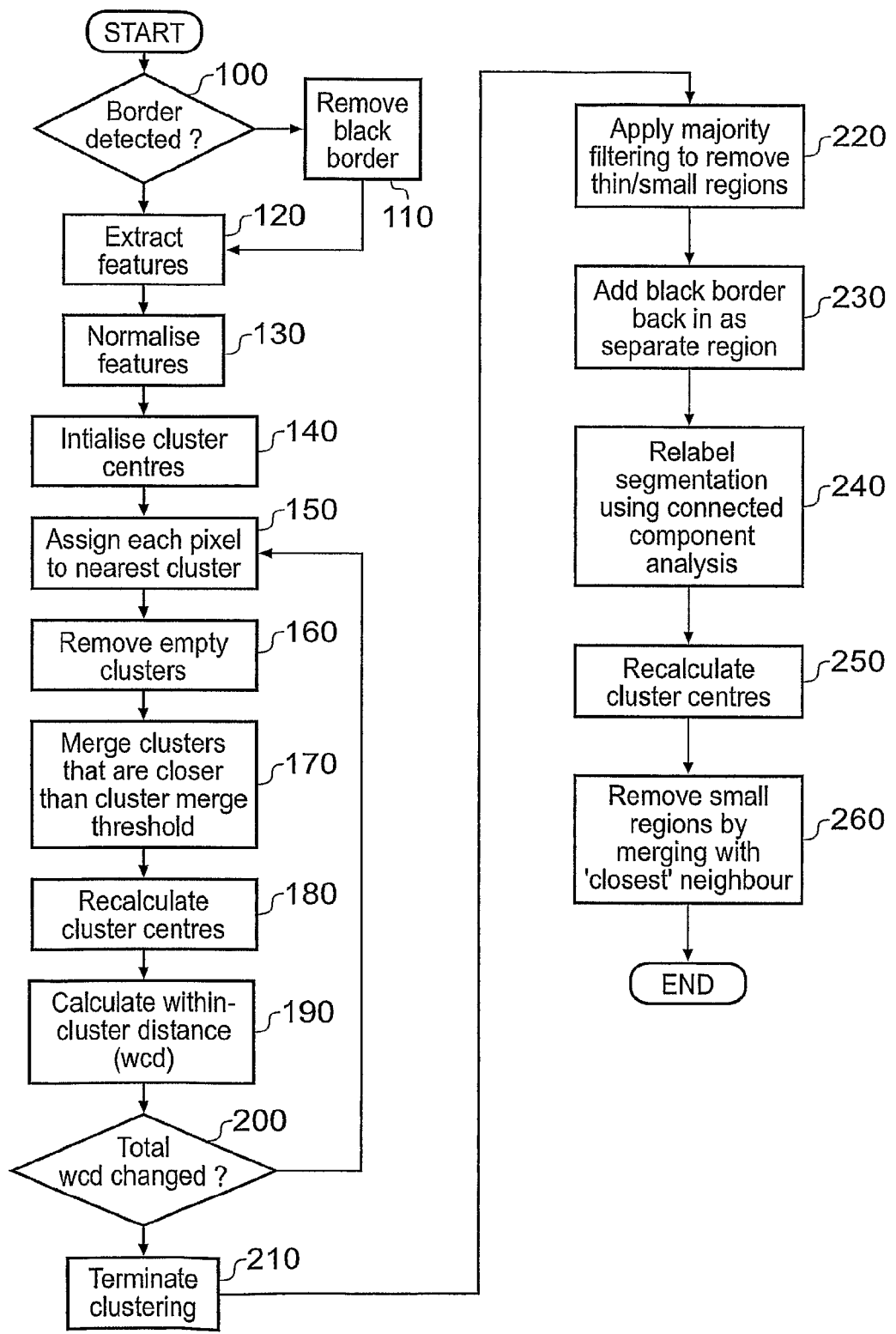
Figure 4:
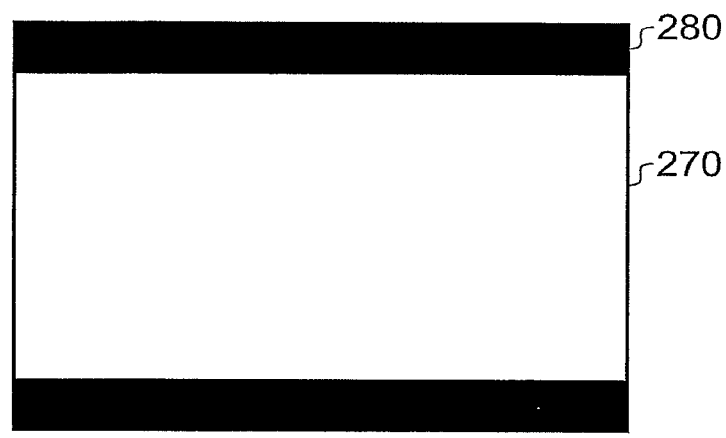
Figure 5:
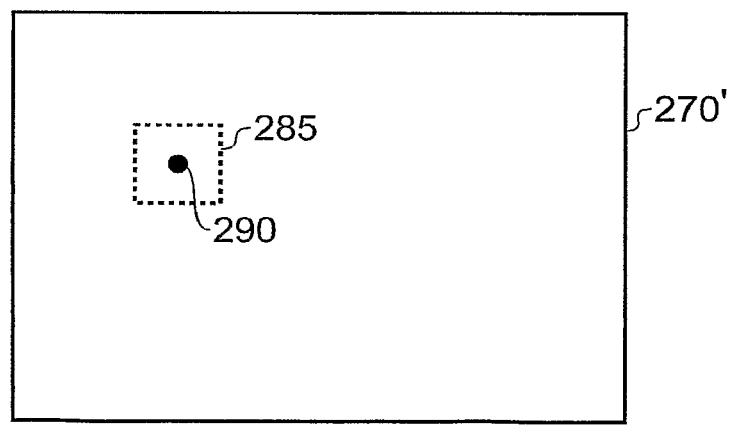
Figure 6:
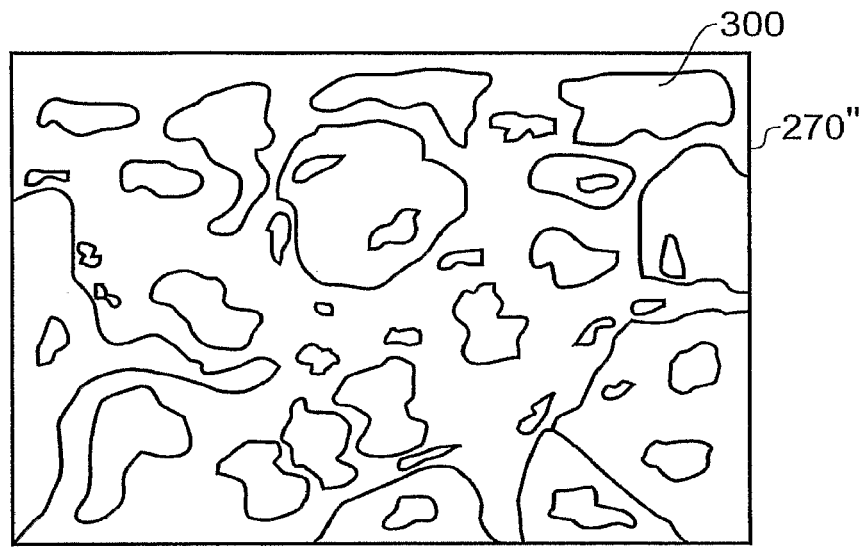
Figure 7:
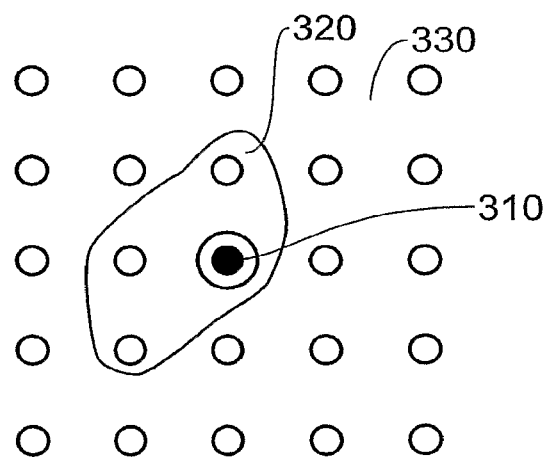
Figure 8:
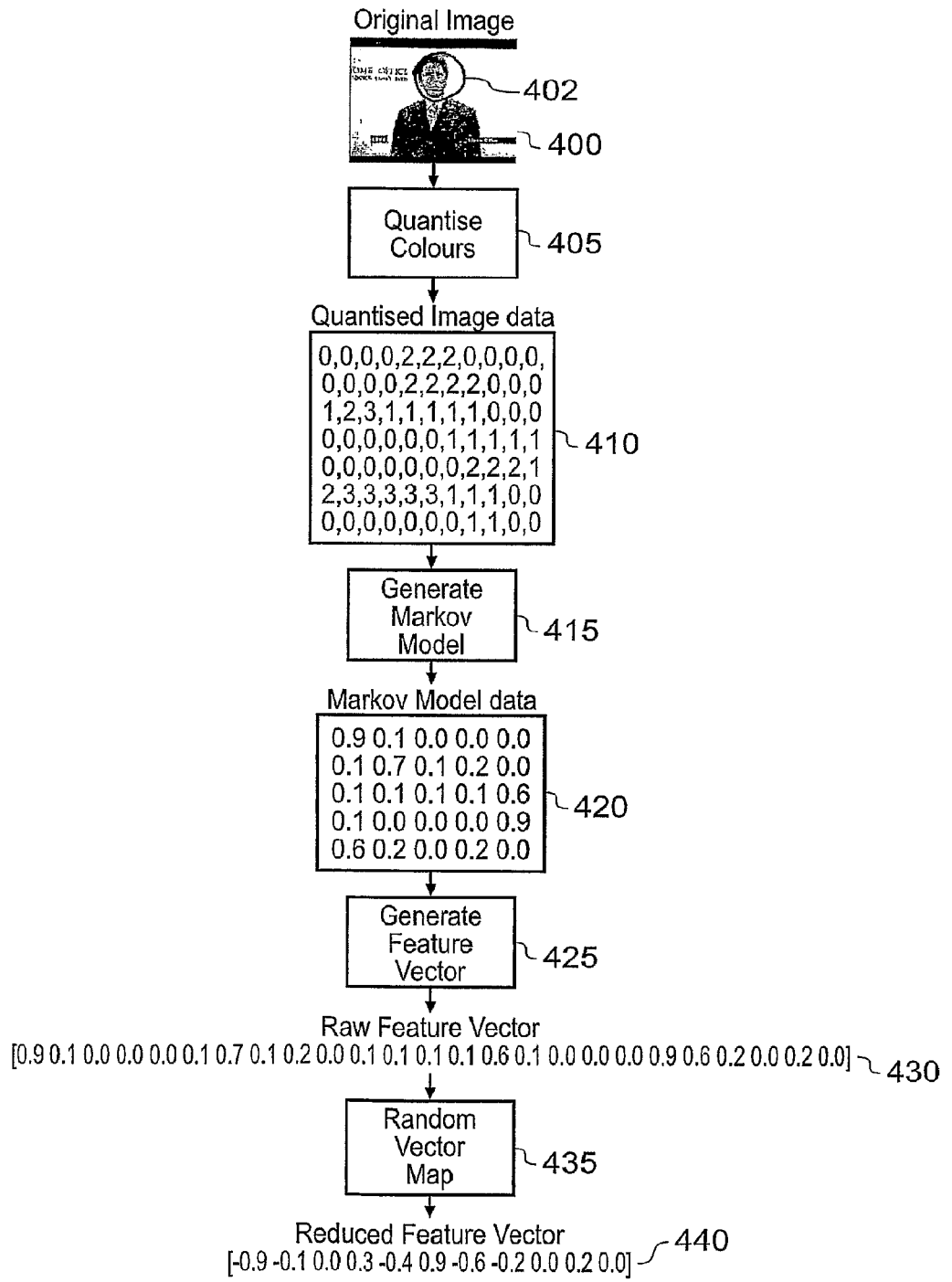
Figure 9:
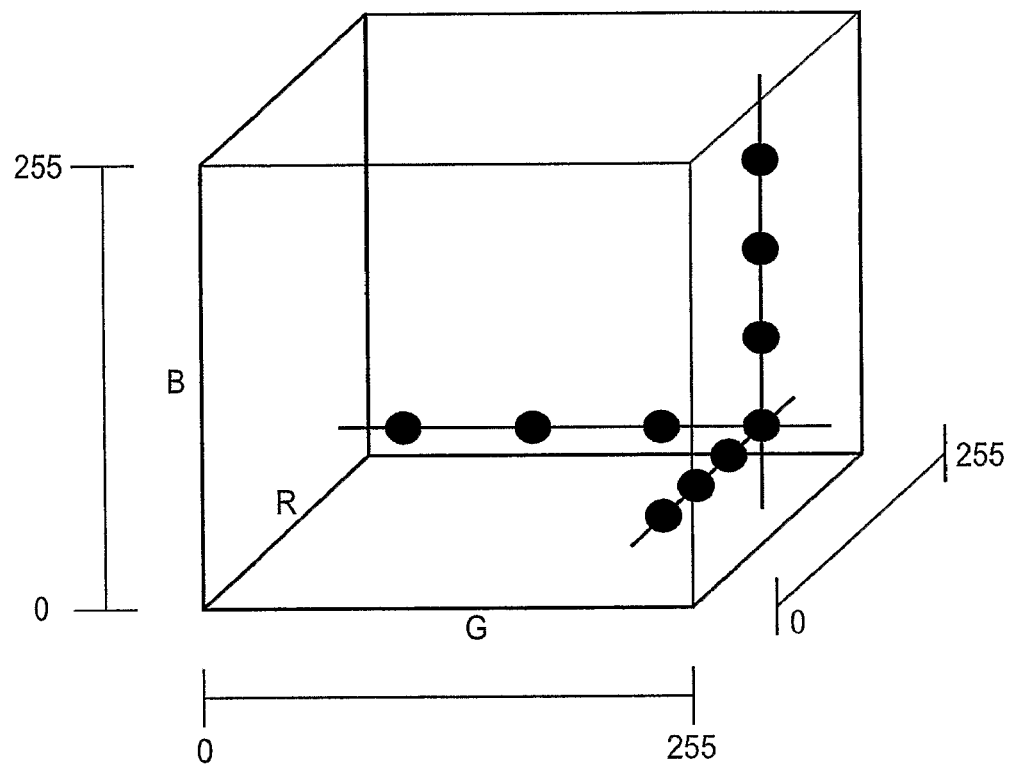
Figure 10:
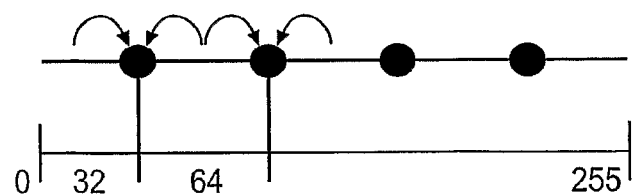
Figure 11:
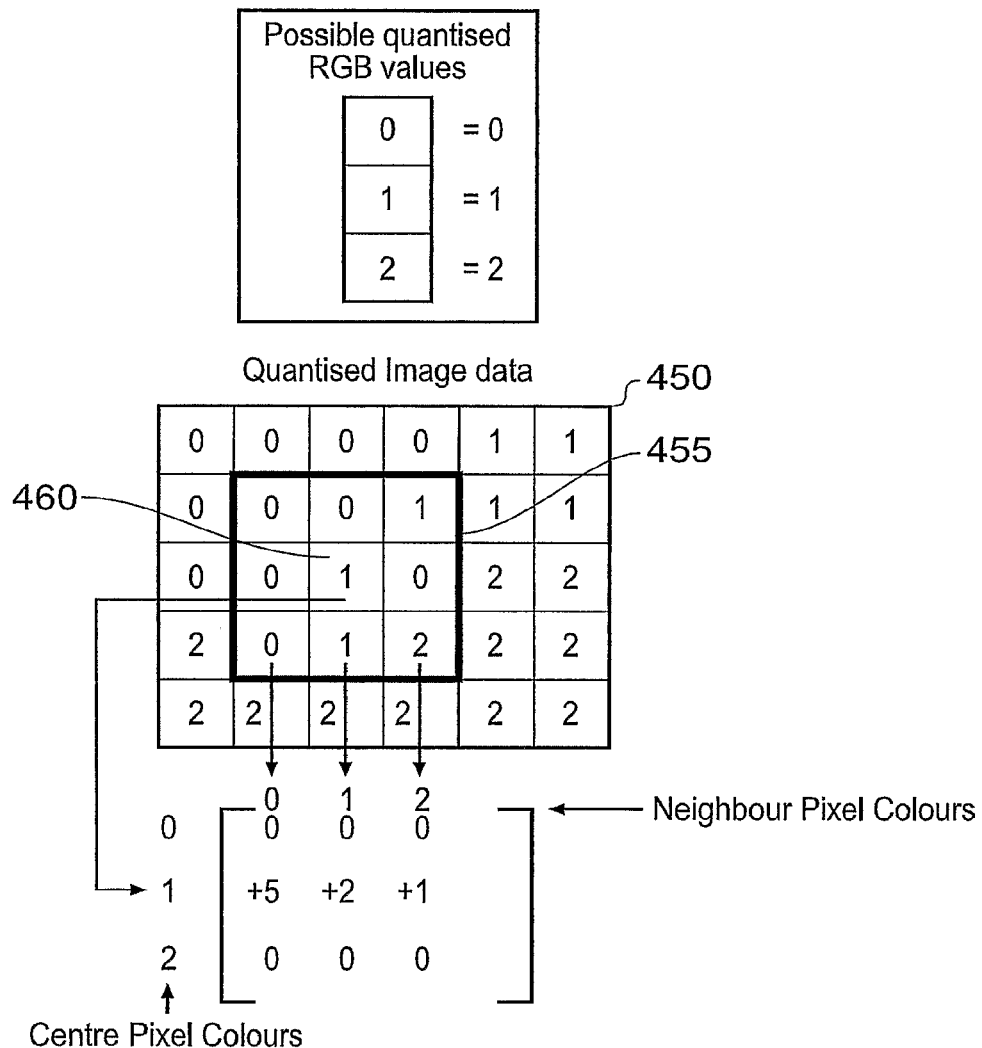
Figure 12:
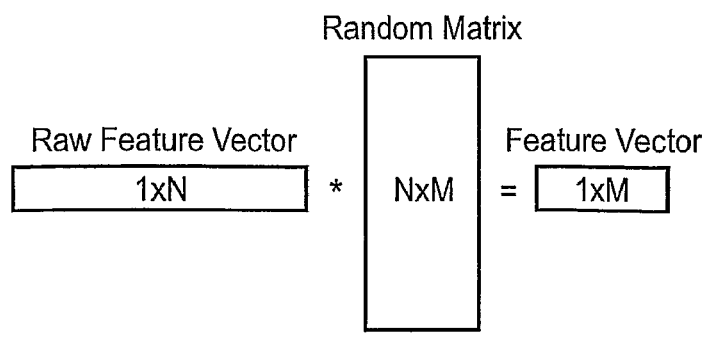
Figure 13:
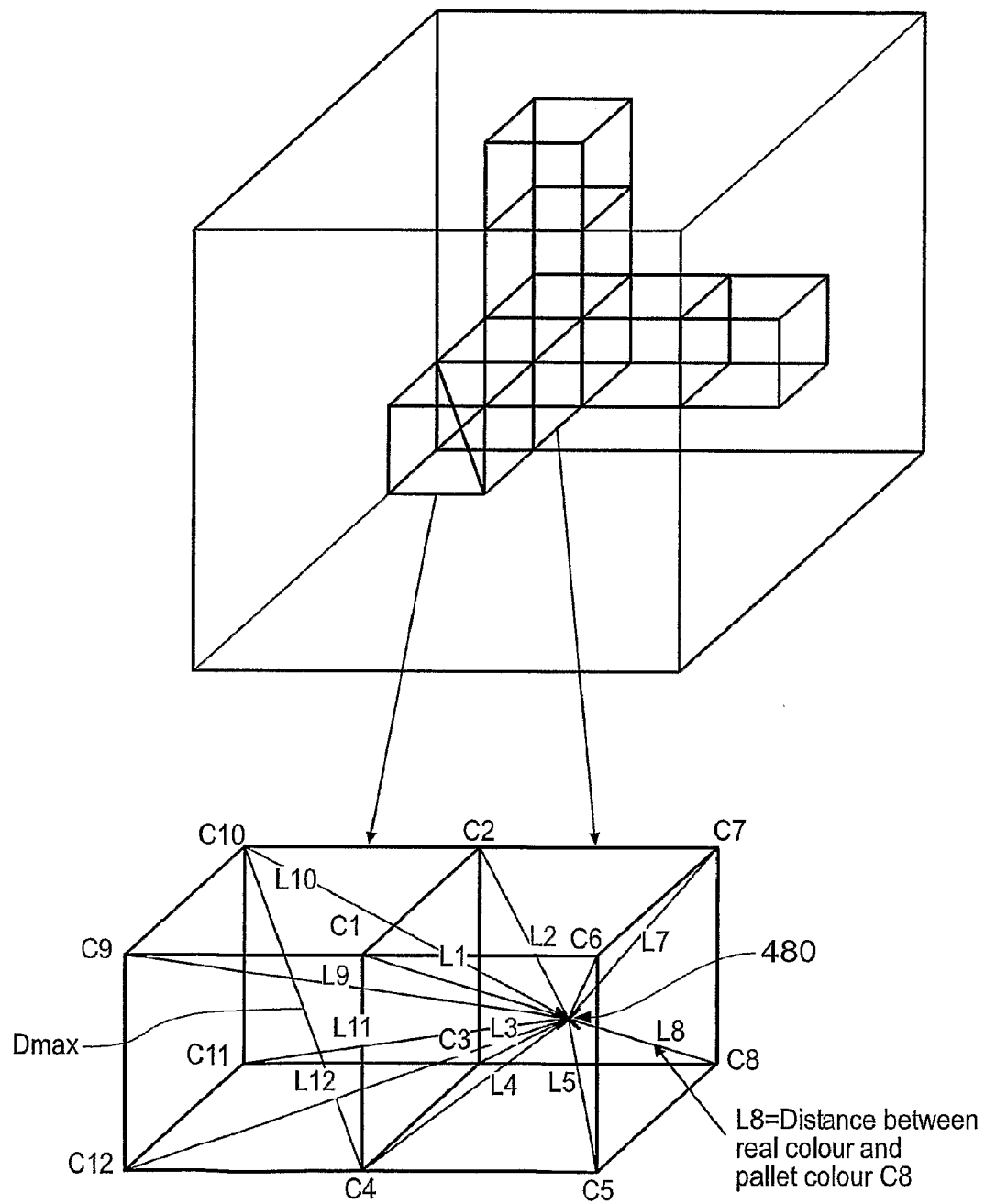
Figure 14:
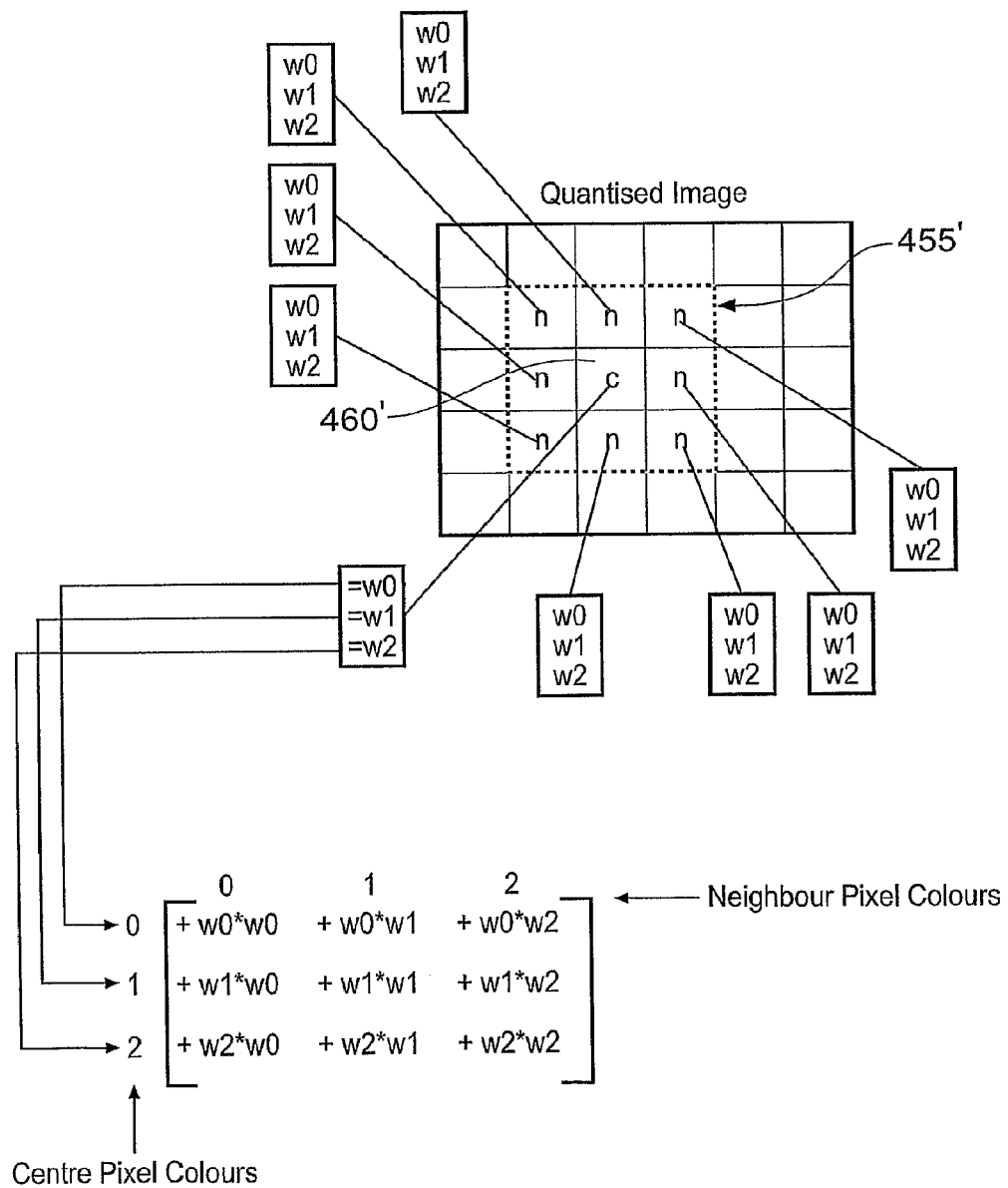
Figure 15:
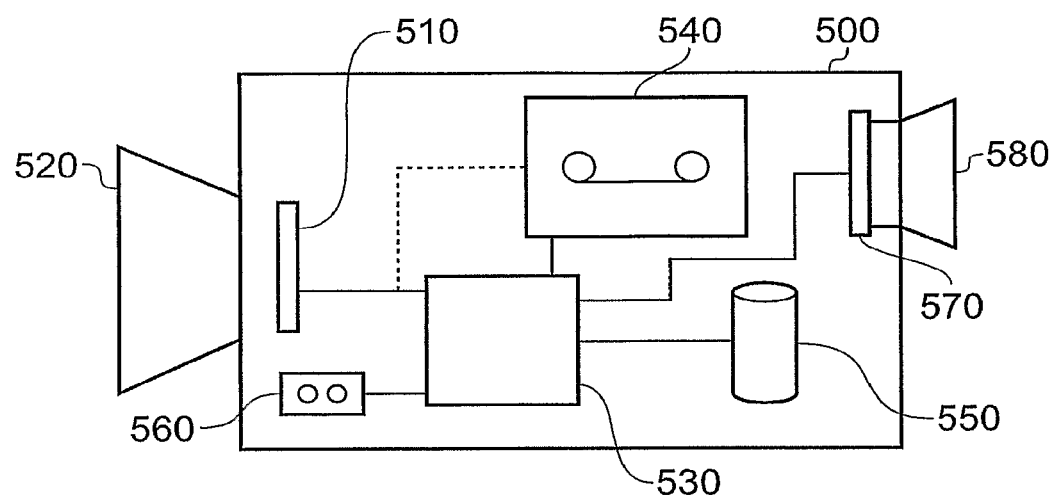
Figure 16:
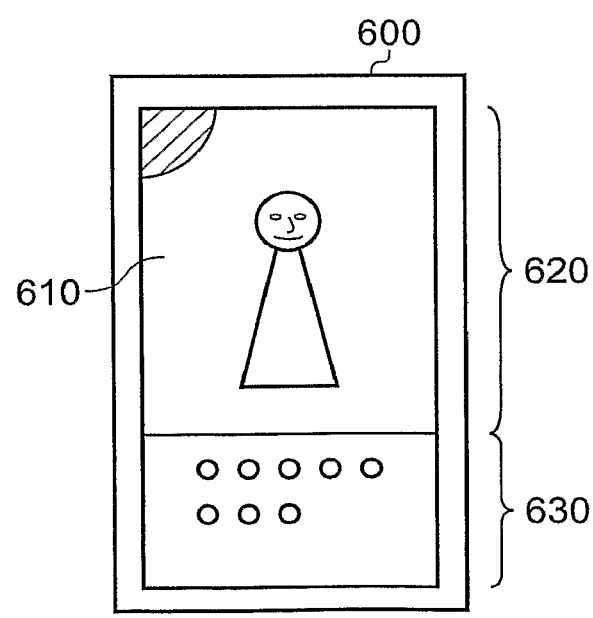
Figure 17:
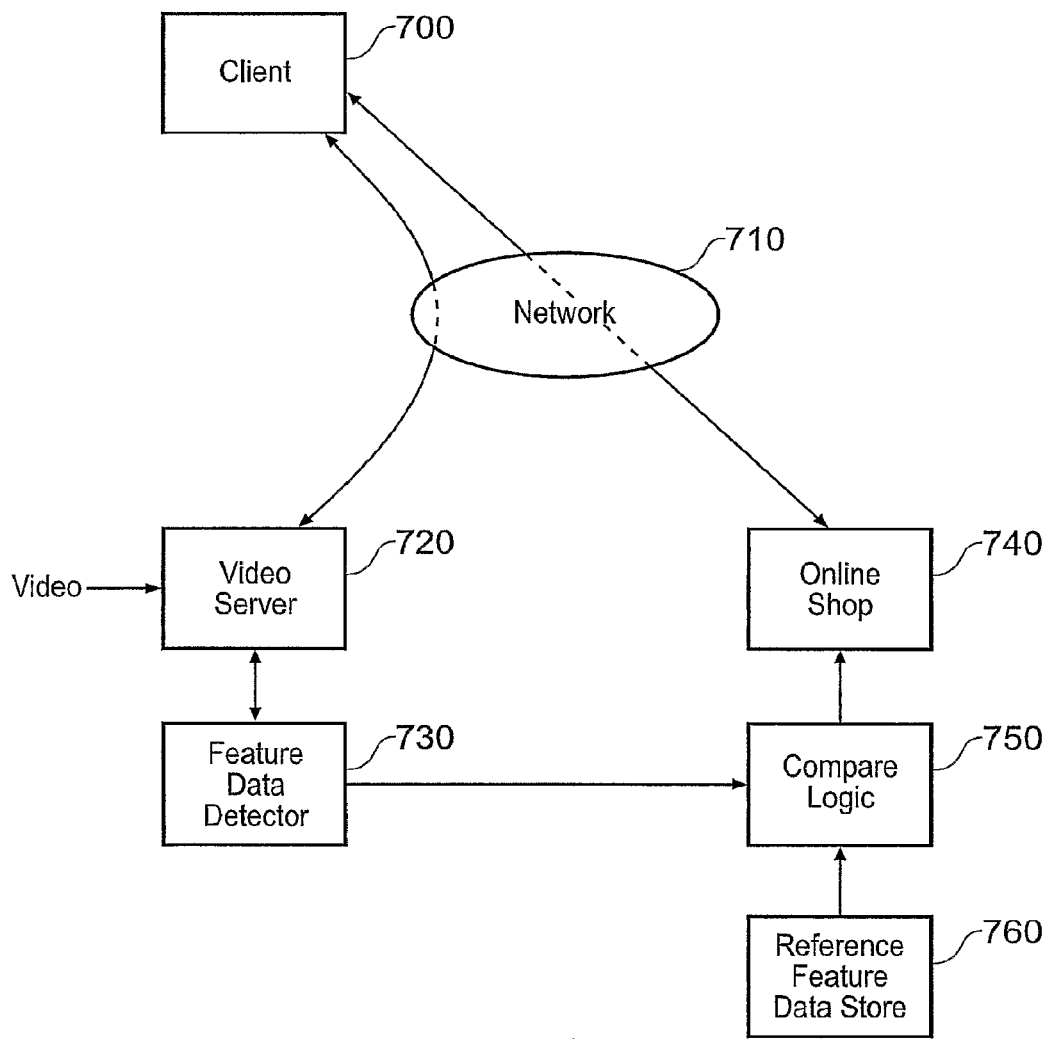
Figure 18:
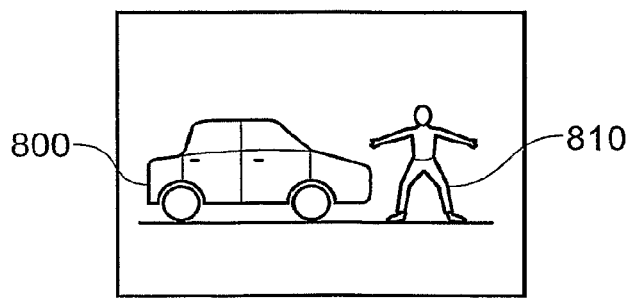

Embodiments of the invention will now be described, by way of example only, with reference to the accompanying drawings in which:

FIG. 1 schematically illustrates an image processing system;

FIGS. 2a and 2b schematically illustrate the partitioning of an image into a plurality of image segments;

FIG. 3 is a schematic flowchart illustrating a process for partitioning an image;

FIG. 4 schematically illustrates an image with a dark border;

FIG. 5 schematically illustrates a search area within an image;

FIG. 6 schematically illustrates an early stage of generating clusters within an image;

FIG. 7 schematically illustrates a majority filtering process;

FIG. 8 is a schematic flowchart illustrating the generation of a feature vector;

FIG. 9 schematically illustrates a quantised RGB space;

FIG. 10 schematically illustrates quantisation boundaries;

FIG. 11 schematically illustrates the generation of a feature histogram;

FIG. 12 schematically illustrates a random mapping process;

FIG. 13 schematically illustrates a weighted colour quantisation process;

FIG. 14 schematically illustrates the generation of a weighted Markov model;

FIG. 15 schematically illustrates a camcorder as an example of a video acquisition and/or processing apparatus;

FIG. 16 schematically illustrates a personal digital assistant as an example of portable data processing apparatus;

FIG. 17 schematically illustrates a network-based shopping arrangement;

FIG. 18 schematically illustrates a user selection display; and

Figure 19:
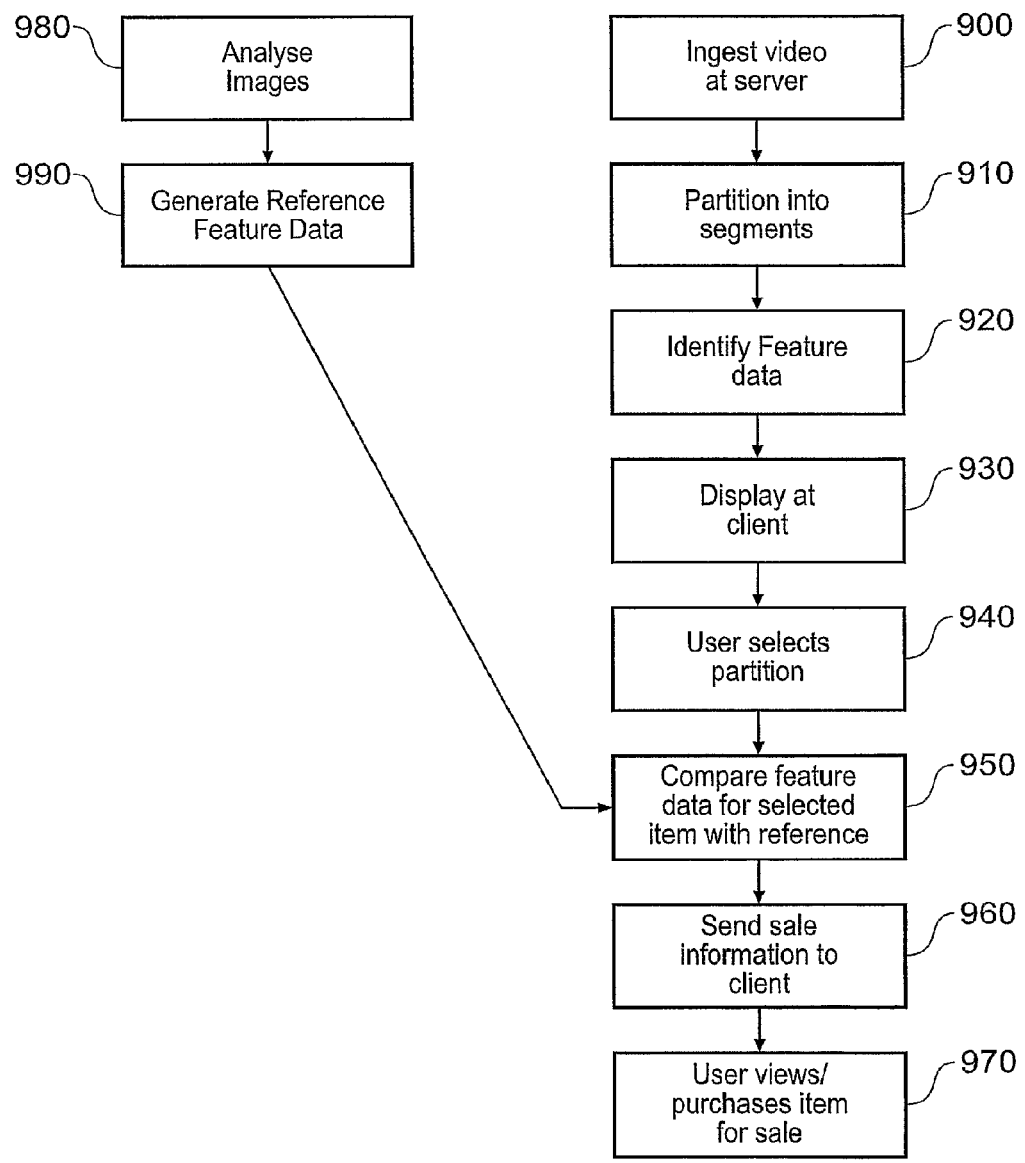

FIG. 19 is a schematic flowchart illustrating the operation of the apparatus of FIG. 17.

FIG. 1 is a schematic diagram of an image processing system based around a general-purpose computer 10 having a processor unit 20 including disk storage 30 for programs and data, a network interface card 40 connected to a network 50 such as an Ethernet network or the Internet, a display device such as a cathode ray tube or liquid crystal display device 60, a keyboard 70 and a user input device such as a mouse 80. The system operates under program control, the programs being stored on the disk storage 30 and provided, for example, by the network 50, a removable disk (not shown) or a pre-installation on the disk storage 30.

In general terms, the image processing apparatus is arranged to partition an image into image segments. So-called feature data is then derived from the segments. This allows images to be compared at a segment level, that is, the properties (as represented by the feature data) of one or more segments of a test image can be compared with properties of other segments in that image or, more usually, in other images, to detect reference images deemed to be "similar" to the image under test or the selected segment(s) of the image under test. Alternatively, the feature data can be compared with artificially generated (or perhaps averaged over multiple instances) reference feature data which could be generically indicative of (for example) a blue automobile, rather than necessarily representing exactly a particular blue automobile.

FIG. 2a schematically illustrates an example image, and FIG. 2b schematically illustrates a sample set of image segments (e.g. a segment 75) derived from the image of FIG. 2a. In general, the segments are illustrated in FIG. 2b as being surrounded by a dark border, but this is just so that the segments can be conveniently represented on paper. The dark border need not be (and probably would not be) present in the actual partitioned image.

The system can associate feature data with each of the segments—for example, a single value representing image (e.g. colour) properties of that segment, or multi-valued feature data referred to generically as a "feature vector" representing various different image properties of the segment.

The image processing system can operate in various modes of operation. In a first mode, a set of images is assembled on the disk storage 30 or on a network disk drive connected via the network 50 and is partitioned, sorted and indexed ready for a searching operation. A second mode of operation is the actual searching involving a comparison of a current image and the indexed and sorted data. A further mode of operation is a quasi-real-time search or comparison operation. For this, the image data need not have been pre-partitioned, indexed and sorted; instead, feature data could be derived from the images to be compared in response to a need for such information.

It will therefore be appreciated that in the embodiments to be described below, operations such as partitioning an image and deriving feature data could be done "in advance", allowing a later comparison of the feature data between images or image segments. Alternatively, they could be carried as required. It will also be appreciated that the feature data could be generated (in part or in entirety) by one system, whereas the comparison takes place on another system using that feature data.

The images are loaded onto the disk storage 30 in a conventional manner. Preferably, they are stored as part of a database structure which allows for easier retrieval and indexing of the items, but this is not essential.

It will be also be appreciated that the feature data and/or the images need not be stored on the local disk drive 30. The data could be stored on a remote drive connected to the system 10 via the network 50. Alternatively, the information may be stored in a distributed manner, for example at various sites across the internet. If the information is stored at different internet or network sites, a second level of information storage could be used to store locally a "link" (e.g. a URL) to the remote information, optionally with an associated summary, abstract or metadata associated with that link. So, the remotely held information would not be accessed unless the user selected the relevant link.

In a further example, the images and/or feature data could be stored across a networked work group, such as a research team, a newspaper publisher or a medical practice. A hybrid approach might involve some items stored locally and/or some items stored across a local area network and/or some items stored across a wide area network. In this case, the system could be useful in locating similar images captured or prepared by others. Or, if a new television programme is being planned, the present technique could be used to check for its originality by detecting previous programmes having similar content.

It will also be appreciated that the system 10 of FIG. 1 is but one example of possible systems which could use the feature data derived from partitioned images. Although it is envisaged that the initial (partitioning) phase could be carried out by a reasonably powerful computer, most likely by a non-portable computer (though possibly by a portable computer with a signal processing function), the later phase of accessing the information could be carried out at a portable machine such as a "personal digital assistant" (a term for a data processing device with display and user input devices, which generally fits in one hand), a portable computer such as a laptop computer, or even devices such as a mobile telephone, a video editing apparatus or a video camera. In general, practically any device having a display could be used for the information-accessing phase of operation. Examples of other suitable devices are described below with reference to FIGS. 10 and 11.

The processes are not limited to particular numbers of images or segments.

FIG. 3 is a schematic flow chart illustrating a process for partitioning an image. The process steps of FIG. 3 will be described with reference to FIGS. 4 to 7.

In FIG. 3, at a step 100, the presence of a dark border around an image to be partitioned is detected. Border of this type often occur because of mis-matches between an image capture format and an image storage/transmission format. For example, when an image is captured in a wide screen mode but stored in a non-wide screen mode, dark borders can be inserted into the image as shown in FIG. 4. Here, upper and lower dark borders 280 have been applied at some previous processing stage to an image 270. If such dark borders are detected at the step 100, they are removed at a step 110. This involves preventing the relevant pixels from taking part in the processing which follows, i.e. cropping the image, so that the border regions are not detected as distinct image segments in the processing which follows. A flag is set to indicate (a) that the cropping has been carried out, and (b) the size of the regions which have been cropped. This allows the borders to be reinstated at a step 230 to be described below.

A maximum border width of (for example) 50 pixels can be predetermined, to avoid cropping the entire image if the scene is generally very dark.

After removal of the borders at the step 110, or after a negative detection of the presence of borders at the step 100, control passes to a step 120 at which so-called "features" are extracted from the image under test. This is carried out as follows. Referring to FIG. 5, at each pixel position 290 within an image under test 270', a block of pixels around that pixel position is defined. An example block is shown schematically as a block 285 in FIG. 5. Typically, the block might be 9×9 pixels. For each such block, the median value of the colour properties R(red), G(green), B(blue), Cb and Cr (colour difference values) are established. In this way, each pixel position has an associated set of five values (R, G, B, Cb, Cr), though these do not represent the actual colour properties of the pixel but rather the median value of the block surrounding that pixel position. These sets of five colour property values for each pixel position represent the features extracted at the step 120.

At a step 130, the features are normalised. The way in which this is carried out in the present embodiment is that the R values across the entire set of pixels relating to a single image are normalised to have a mean of zero and a standard deviation of one. The same condition is applied to all of the G values across the image and so on.

At a step 140, the process of clustering pixels together is started. In particular, the step 140 involves an initialisation of the centres of a set of clusters.

The clusters are expressed in a multi-dimensional (R, G, B, Cb, Cr) colour (or feature) space rather than—at this stage—relating to adjacent regions in the image space. So, the aim is to group together those pixels which have similar colour properties rather than (necessarily) those which are close together in the image spatial domain.

The cluster centres are set up as follows.

An initial set of $2^{number\_of\_variables}$ clusters, i.e. 32 clusters, is set up. In the (R, G, B, Cb, Cr) space, the centres of these clusters are set up so as to correspond to the set of positions for which the individual variables R, G, B, Cb, Cr have either a minimum or maximum value. Examples of the co-ordinates in the colour space of the initial 32 cluster centres are as follows:

($R_{min}$, $G_{min}$, $B_{min}$, $Cr_{min}$, $Cb_{min}$)
($R_{max}$, $G_{min}$, $B_{min}$, $Cr_{min}$, $Cb_{min}$)
...
($R_{max}$, $G_{max}$, $B_{max}$, $Cr_{max}$, $Cb_{max}$)

This completes the step 140, the initialisation of the cluster centres. Control passes to a step 150, where each pixel is assigned to the cluster centre which is nearest to that pixel in the colour space. The distance between a pixel's position in the colour space and the cluster centres is calculated using conventional mathematical techniques including a detection of the Euclidean distance between the two positions in colour space. At the end of the step 150, all of the pixels in the image under test have been assigned to a cluster centre.

At a step 160, any empty clusters are removed. So, the number of clusters will tend to decrease each time the iteration of steps 150 to 200 is carried out.

At a step 170, any clusters which are closer together (in the five-dimensional colour space) than a cluster merge threshold are merged together.

At a step 180, the cluster centres are recalculated. As described above, the cluster centres were initialised to extremes of the five variable values in the colour space. At the step 180, the cluster centres are recalculated to be the mean positions (in the colour space) of all of the pixels in that cluster. So, for example, the R values for all of the pixels in a cluster are combined to form a mean R value which forms the new R-co-ordinate of the cluster centre for that cluster.

At a step 190, a variable referred to as "within-cluster-distance" (wcd) is calculated for each cluster. The formula for deriving wcd is as follows:

$$wcd = \Sigma distance(pixel, cluster\ centre)$$

Accordingly, wcd represents the total of displacements of the pixels (in the colour space) from their respective cluster centres.

At a step 200, a test is carried out to see whether the sum of all wcd values (total wcd) has changed since it was last calculated. Of course, the first pass through the loop of steps 150 to 200 will generate a first value of wcd, so the test at the step 200 will be positive and control will return to the step 150. Thereafter, the comparison is made between a newly calculated value of total wcd and the corresponding value calculated during the previous iteration.

The test at the step 200 could be absolute, i.e. "has total wcd changed at all?", or a threshold test could be applied, i.e. "has total wcd changed by less than a threshold amount?".

After an appropriate number of iterations, the step 200 will detect that total wcd has not changed since the last iteration and control passes to a step 210 where the clustering operation is terminated.

So far, the pixels have been considered as being clustered together in the feature space (colour space) represented by five variables (R, G, B, Cb, Cr). Consideration now passes to grouping the pixels in the image spatial domain, with the aim of generating a small number of image segments which are individually contiguous and which represent similar parts of the image, at least in so far as their colour properties are similar. Here, there is no precise definition of the desired "small" number, as this will depend entirely on the image content.

If the clustering which has been carried out as far as the step 210 is represented in the image domain, so that pixels in the same cluster are grouped together in a displayed version of the image, an example of the result might be that shown in FIG. 6, where contiguous groups of pixels 300 in the image 270" arise from the same cluster. Note that one cluster (in the colour space) might be represented by several distinct image areas in FIG. 6.

Considering each of the bordered areas 300 in FIG. 6 as an image region, at a step 220, so-called majority filtering is applied to remove thin or small regions. Majority filtering is schematically illustrated in FIG. 7, which shows an array of pixels around a centre pixel 310. The pixel 310 actually falls within a small region 320 which is surrounded by a larger region 330. The effect of the majority filtering is to examine the array of pixels surrounding the pixel 310 and assign the pixel 310 to the region having the greatest representation amongst the array of pixels. In the example of FIG. 7, it can be seen that this would involve reassigning the pixel 310 to the region 330. The same would apply to the other pixels within the small region 320, so that the region 320 would effectively disappear. In practice, a 9×9 array of pixels may well be used for the majority filtering step.

At a step 230, if necessary, the dark border removed at the step 110 is reapplied.

At a step 240, connected component analysis is performed to determine which pixels in each cluster are contiguous. Connected component analysis involves scanning the pixels horizontally and vertically to detect whether or not neighbouring pixels (in the image domain) belong to the same cluster. Contiguous pixels belonging to the same cluster are given the same region number. Non-contiguous pixels belonging to the same cluster are given separate region numbers. After this process, there will normally be at least as many regions as before the process, and often several more. Note that this stage could be omitted if it is considered acceptable to have some regions which are non-contiguous.

At a step 250, the number of clusters is reset to equal the current number of image regions, with a one-to-one correspondence between clusters and regions. A cluster centre for each newly established cluster is calculated as described above.

Finally, at a step 260, any remaining small regions (fewer than 500 pixels) are merged with their closest neighbour region. This is carried out as follows.

For regions of fewer than 100 pixels, merge with the neighbouring region that corresponds to a cluster centre closest to that of the region to be merged.

For regions between 100 and 500 pixels, calculate a "merge cost" as follows:

merge cost = (number of pixels)$^{1/2}$ + smallest inter-cluster distance with any spatially neighbouring region If the merge cost is less than a predetermined threshold, the regions are merged.

Otherwise they are not merged.

A system will be described below whereby a segmented image is used as the basis for comparing image segments with those in other images through the use of a feature vector. Other applications of image segmentation include:

1. Region-based video coding (e.g. at a low bit rate). Regions (segments) could encoded by a description of the area each region covers and a description of its colour and/or texture. This is especially useful for very low bit rate video coding for use in mobile phones, handheld devices, video over IP and the like, where the screen resolution is likely to be low and the representation of image regions as a single colour/ texture is unlikely to have a large impact on subjective quality.
2. Region activity based video coding. Images are divided into regions and coded using an object-based coding scheme. Smooth (low activity) regions are treated less harshly during quantisation than textured (higher activity) regions, as texture is generally better at hiding quantisation noise.
3. Image/video compositing. The image/video is segmented into object. This allows the selection of objects for extraction and insertion into other video/images, i.e. without the need for conventional "blue screen" chroma keying.
4. CCTV (closed circuit TV) analysis. CCTV images are divided into objects such that the user can select objects or areas of the image either to ignore or to pay special attention to during automatic monitoring (e.g. during computer vision operations such as crowd counting, analysis of suspicious behaviour, vehicle tracking, traffic analysis, motion detection etc).
5. Machine vision applications, e.g. counting the number of (possibly unknown) objects on a conveyor belt etc.
6. Medical image segmentation and diagnosis e.g. cell detection.
7. Analysis of aerial photographs, for example segmentation into different homogeneous regions classification of the regions into different land uses.

The processing described so far has provided the partitioning of an image into respective image segments. Now, in order to be able to compare the segments with one another or with other reference segments (or data generated in respect of generic reference segments), it is appropriate to derive feature data (e.g. a so-called "feature vector") from each segment. A technique for deriving a feature vector from each image segment will now be described.

Accordingly, the following description can relate to pixels within a segment as identified by the process above. Alternatively, the following process can be applied to an entire image. That is to say, although it is particularly useful in the context of a segmented image, it is separately applicable without necessarily requiring an image to be segmented.

FIG. 8 is a schematic flowchart illustrating the generation of a feature vector. To avoid any confusion over the nature of FIG. 8, the flowchart includes four steps (steps 405, 415, 425 and 435). In between those steps, the respective inputs/outputs are schematically illustrated (as data 400, 410, 420, 430 and 440).

The process starts with a region 402 (identified as described above) in an input image 400. As mentioned above, the process which will be described is applicable to an entire image or to a region within an image.

First, at the step 405, the colour properties of the pixels within a segment are quantised to four difference values for each of the R, G, B colour properties (Cr and Cb are not used in this process).

Four values of three variables give 64 possible levels. A schematic representation of a 64-level colour cube is shown in FIG. 9. Here, the black dots (many of which are not shown, for clarity of the diagram) illustrate possible quantised points within the RGB space. R, G and B values are each quantised to the nearest such point.

The raw RGB data, in this embodiment, is represented by three 8-bit values and so each of R, G and B can have a value between 0 and 255. The quantisation boundaries are set to give the centres of the quantisation sub-ranges at 32, 96, 160 and 224. This means that the overall range of 0 to 255 is divided into four substantially equal sub-ranges.

The quantisation process of the step 405 gives rise to quantised image data 410.

The quantisation of the colour space is an important part of the system, as the size of the raw feature vector (see below) is the square of colour palette size. For example, if the colour palette consisted of all the discrete points in the 24 bit RGB space the palette size would be $256^3$ and the raw feature vector size would be $256^6$ which would be impractical in many situations. Experiments have been done with non-linear quantisation of hue-saturation-value (HSV) space and linear quantisation of the 24 bit RGB space. Linear quantisation of the 24 bit RGB space was found to cause fewer problems with quantisation errors, but other quantisation schemes could of course be used.

A Markov model is generated at the step 415.

For each pixel, the process identifies its eight neighbours in a 3×3 square array around that pixel. Here, the neighbours are restricted to those within the current region, so if a pixel lies at an edge of the current region, it will be considered to have fewer than eight neighbours.

A two dimensional 64×64 bin (i.e. 4096 bin) histogram is built up a so-called Markov model of the region.

The histogram is built up as follows.

For each pixel, its own quantised pixel value (in the 64-value range, numbered according to a predetermined order as values 1 to 64) forms a position along one axis of the histogram. Each neighbour-pixel value, again expressed in the range 1 to 64, forms a position along the other axis of the histogram. Accordingly, for a particular centre pixel, there could be up to eight different bins identified by the corresponding neighbour pixel values. Each of these bins, representing a respective permutation of pixel and neighbour pixel properties, is incremented. More generally, each bin represents a permutation of properties within a contiguous pixel group, which in the present embodiment comprises two pixels but could have more. In one view, the Markov model could be said to represent the texture of the image segment.

The process then repeats for the centre pixel value of a next pixel and its eight neighbour pixel values. Over the whole region under consideration, this will populate a 64×64 bin two dimensional histogram.

FIG. 11 schematically illustrates the generation of a feature histogram, but with reference to the heavily simplified situation of only 3 (instead of 64) quantised RGB values, 0, 1 or 2. Within a local image area 450, a 3×3 pixel scan window 455 is arranged around a centre pixel 460.

The colour of the centre pixel (within the 3-value colour space in this simplified example) defines a row in the histogram at the bottom of FIG. 11. The colour of each neighbouring pixel then defines a column. Where the row and the columns intersect, the bin is incremented. In the example shown, the scan window's centre pixel has colour index 1. It has a total of 8 neighbouring pixels, from which 5 are colour index 0, 2 are colour index 1 and 1 is colour index 2. This results in that the Markov model is increased by 5 in the bin at row 1 and column 0, 2 in the bin at row 1 and column 1 and 1 in the bin at row 1 and column 2.

The histogram is then normalised. This could be carried out on a region-by-region basis and/or across the group of histograms relating to an entire image. The normalisation process is such that the sum of all the values in one row is equal to 1. Reference is made to the following normalisation equations which refer to simplified 3×3 example of the drawings:

$$\begin{bmatrix} x_{0,0} & x_{0,1} & x_{0,2} \\ x_{1,0} & x_{1,1} & x_{1,2} \\ x_{2,0} & x_{2,1} & x_{2,2} \end{bmatrix} \cdot \begin{bmatrix} 1 \\ 1 \\ 1 \end{bmatrix} = \begin{bmatrix} \sum_{j=0}^{2} x_{0,j} \\ \sum_{j=0}^{2} x_{1,j} \\ \sum_{j=0}^{2} x_{2,j} \end{bmatrix} = \begin{bmatrix} x_0 \\ x_1 \\ x_2 \end{bmatrix}$$

$$MarkovModel = \begin{bmatrix} \frac{x_{0,0}}{x_0} & \frac{x_{0,1}}{x_0} & \frac{x_{0,2}}{x_0} \\ \frac{x_{1,0}}{x_1} & \frac{x_{1,1}}{x_1} & \frac{x_{1,2}}{x_1} \\ \frac{x_{2,0}}{x_2} & \frac{x_{2,1}}{x_2} & \frac{x_{2,2}}{x_2} \end{bmatrix}$$

A schematic representation of example normalised Markov model data is provided as the data 420 in FIG. 8.

A feature vector is then generated at the step 425.

The feature vector is generated by concatenating all $64^2$ values in the 2 dimensional normalised Markov histogram (corresponding to the image or to a particular image region) to form a 4096 value vector. The concatenation takes place according to a predetermined, though arbitrary, order. A schematic example of such a feature vector, referred to as a "raw" feature vector, is provided as the data 430 in FIG. 8. Note that not all 4096 values have been shown, for clarity of the diagram.

Then, the 4096 value vector is reduced to a 200-value vector at the step 435 by either principal components analysis or random mapping. The random mapping technique is well described elsewhere, and involves multiplying the 4096 value vector by a 200×4096 random matrix, which may be stored in a pre-set form for use in this technique. FIG. 12 provides a schematic representation of this random mapping process, in which a 1×N vector is reduced to a 1×M vector by matrix-multiplying the 1×N vector by an N×M matrix of random numbers. Previous published work has shown that although the resulting vectors may be much shorter, their dot product remains substantially the same after the random mapping process.

The output of the random mapping process is a 200-value "reduced" feature vector indicative of the colour properties of the image or each image segment. A schematic example is shown as the data 440 in FIG. 8, but once again not all 200 values have been shown, for clarity of the diagram. The main point of this schematic representation is to recognise that the reduced feature vector is shorter than the raw feature vector.

It will of course be appreciated that the reduced feature vector need not be 200 values in length. This number was selected as a reasonable compromise between the requirement to be short (for ease of storage and other processing) and the requirement to have a sufficient length to be accurately representative of the colour properties. But other lengths could be used.

In order to compare two image segments (or at least to compare derived feature data with reference feature data), the distance between their feature vectors is established. A lower distance implies a greater similarity.

An example of the use of this technique is for a user to select one or more segments from an image such as the segmented image of FIG. 2B. For example, the user might select the segment labelled as 75. A feature vector is derived from that segment and is compared with feature vectors from other segments within the same image and feature vectors from segments in other images (i.e. in a database to detect similar image segments). Note that the normalisation process means that image segments of different sizes can still be detected to be similar if their colour properties are similar.

The feature vectors for all of the segments could be generated in advance, or could be generated as needed. In a hybrid approach, where a database of images is held, feature vectors could be generated in advance for the stored images. When a new image is to be compared with the database, a feature vector is generated from that image alone (or from a segment of that image).

If the user selects more than one segment, there are various different ways of dealing with this. The segments could be treated individually and a corresponding set of results (similar segments) could be derived for each of the selected segments. Alternatively, the user-selected segments could be treated in combination, so that the distances between the user-selected segments and a segment under test are combined, and a set of results is derived for which the combined distance is the lowest. The combination of distances from two (or more) user-selected segments to a segment under test is usually done by simply multiplying the two or more distances. It is also possible to allow the distances to relate to more than one segment under test, as long as all the segments under test belong to the same image. In this case, the smallest distance of any segment in the test image to each user-selected segment is used in the multiplication. The system then returns the test image that has the smallest overall distance.

A modification providing an improvement to the above technique will now be described. In some circumstances, the use of a small number of quantisation levels (64 quantisation levels) means that the boundaries between the quantisation levels are too sharp. A small change in colour properties can lead to a dramatic change in the quantisation level assigned to a pixel. So, for example, a slightly brighter sky region could lead to a very poor correlation with other sky regions because of the change in quantised level for that region.

A solution to this feature is to assign contributions from each neighbour pixel in FIG. 11 to the various bins. So, each centre pixel value (there will be several contributions to the centre pixel value) is set on the vertical axis as before, but for each neighbour pixel, non-integer contributions are added to multiple bins in dependence upon the distance between that neighbour-pixel (in colour space) and the nearest quantisation levels. An example of such an arrangement will now be described with reference to FIGS. 13 and 14.

The main difference provided by the arrangement of FIGS. 13 and 14 is a reduction of the effect of quantisation errors. The changes affect the colour quantisation step 405 and the Markov model generation step 415. The following describes how the weighting affects the previously described algorithms.

The 24 bit RGB space is divided in the same way as described above. But instead of quantising a particular pixel colour to one palette colour, it is quantised to several palette colours and the contribution to each palette colour is recorded.

FIG. 13 schematically illustrates a sub-group of the quantised points of FIG. 9. Each point C1 . . . C12 represents a quantised RGB colour in the 3-dimensional RGB space. A real (unquantised) pixel would be unlikely to fall directly on one of the quantised points, but would generally fall in between quantised points. In FIG. 13, a pixel under consideration falls at a position 480 in the RGB space. The distance, in RGB space, between the pixel position 480 and a quantised point Cn is shown as Ln.

It could be said that the real colour consists of contributions from the nearest palette colours. To calculate the contributions from each palette colour, take the maximum distance Dmax (illustrated as a line between the quantisation point C4 and the quantisation point C10 in FIG. 13, representing the maximum distance within the quantisation grid) and subtract the distance between the palette colour and the real colour. This generates a respective weight value wn.

If the weight wn>0 the palette colour is used in the following process; otherwise it is discarded or set to zero.

For each real colour there is therefore generated a collection of contributing palette colours and their weights. Each such collection is normalised so that the sum of each collection's weights is one.

The Markov model is in principle generated the same way as described above, but instead of having one palette colour representing each pixel, there is now a collection of palette colours with weights representing each pixel.

This situation is represented schematically in FIG. 14 which illustrates a set of weights w0, w1 and w2 for a centre pixel 460' and the surrounding 8 pixels in a scan window 455'. As before, a palette (quantised colour space) of just three colours is used.

When determining the contribution of neighbouring pixels to the model, a number of cells in the two dimensional histogram are affected instead of just one. The appropriate contribution to the histogram is found by multiplying the column vector of weights for the centre pixel by a row vector of weights for the neighbouring pixels to give a matrix with the same dimension as the Markov model matrix. Each of those matrices are added to the model matrix.

For example, consider the transition between the centre pixel 460' and one of the neighbouring pixels 'n' in FIG. 15, it can be seen that for each such relation there are 9 contributions to the Markov model. Note that the schematic example here has a colour palette with 3 colours and a Markov model of size 3×3, therefore 9 contributions. The real application has a colour palette with 64 colours and a Markov matrix of size 64×64, and the contribution for each neighbour is a matrix of size 64×64 (if colours with weight wn<0 are set to zero—see above) or up to 64×64 (if such colours are discarded)

As previously, when the whole region has been scanned, the Markov model matrix is normalised so the sum of each row is equal to one.

FIG. 15 schematically illustrates a camcorder 500 as an example of a video acquisition and/or processing apparatus, the camcorder including an image capture device 510 with an associated lens 520; a data/signal processor 530; tape storage 540; disk or other random access storage 550; user controls 560; and a display device 570 with eyepiece 580. Other features of conventional camcorders or other alternatives (such as different storage media or different display screen arrangements) will be apparent to the skilled man. In use, metadata relating to captured video material may be stored on the storage 550, and an SOM relating to the stored data viewed on the display device 570 and controlled as described above using the user controls 560.

FIG. 16 schematically illustrates a personal digital assistant (PDA) 600, as an example of portable data processing apparatus, having a display screen 610 including a display area 620 and a touch sensitive area 630 providing user controls; along with data processing and storage (not shown). Again, the skilled man will be aware of alternatives in this field. The PDA may be used as described above in connection with the system of FIG. 1.

The feature vectors derived by the above process could be used to train and/or populate a self-organising map for display, such as a map disclosed in GB-A-2 393 275.

Images or material could be classified by grouping together into a classification all images or segments having a feature vector within a threshold distance of a classification feature vector. The classification feature vector can be set analytically or could be derived as the average feature vector of a set of images or segments which the user has decided are linked by a common concept (e.g. beach views).

In summary of the feature vector generation technique, a colour based feature vector is provided that is rotation, translation and scale invariant. The feature vector can be used to search image databases using all or part of an image. The feature vector is based on a Markov model that describes the colour transitions within the image. The feature vector is based on a Markov model that describes the colour transitions within the image. To enable the use of a Markov model on the colour property a technique has been developed to quantise the RGB colour space to a palette colour space, which represents the states in the Markov model.

A further application of the above techniques will now be described with reference to FIGS. 17 to 19.

FIG. 17 schematically illustrates a network-based shopping arrangement in which a user's data processing apparatus or "client" 700 is connected, via a network 710 (such as a local area network or—more usually—the internet, to a video server 720 and an online shopping server 740.

The apparatus also comprises: a feature data detector 730, comparison logic 750 and a reference feature data store 760. Note that the division of functionality into the three areas of the client, the video server and the online shop is generally arbitrary and in most instances technically unimportant. In particular, the units 730, 750 and 760 may each be implemented as a part of the client, the video server or the online shop. Furthermore, the video server and the client could be implemented as a single client processor. The particular arrangement shown in FIG. 17 is provided simply for ease of explanation.

Reference will also be made in the following description to FIG. 18, which shows a schematic user selection display at the client 700, and to a schematic flowchart shown in FIG. 19. Once again the flowchart relates to the particular example arrangement of FIG. 17.

The video server ingests video data (a step 900), which involves uploading video data onto a video data store at (or associated with) the video data server. At a step 910 the video server partitions each (or a subset) of the video images into segments using techniques described above. At a step 920, feature data is derived by the feature data detector 730 and is associated with data defining which segment (for display) has that feature data—a process referred to in the flowchart as "identifying" the feature data. In other words, each segment (or some of the segments) within an image has associated feature data, and the segment and the feature data are associated together by identifying data.

Clearly, if the video data has been generated by capture apparatus such as that shown in FIG. 15, or if it has been pre-processed to derive segments and/or feature data, then not all of the steps 910 and 920 may be needed. Similarly, there is no technical necessity to store the video data at the video server; the video server could operate substantially in real time to forward video data onto the client. Further, the feature data (and even the segmentation) need not be pre-derived; it or they could be derived as required when the user selects a segment at the client (see below).

At a step 930, the video images are displayed at the client. An example of a displayed image is shown in FIG. 18. Here two image segments are indicated by reference numerals: a segment 800 relating to the rear of a car, and a segment 810 relating to a person's trousers. The segments identified by the segmentation process (the step 910) could be identified on the display (e.g. by an outline, or by a cursor changing in nature in a similar manner to a cursor passing over a hyperlink in Microsoft® Internet Explorer™) or alternatively identification need not be provided.

The user has a pointing device such as a mouse, thumb-wheel, touch sensitive screen or the like. The user is able to point to an area on the displayed image, in order to select one of the segments or partitions of the image (a step 940). A selection control such as a mouse button may be used to indicate an area to be selected. If the user's point (and/or click) falls within one of the partitioned segments (whether or not the partitioning process has already taken place) the feature data associated with that segment is passed to the comparison logic 750. Here, at a step 950, that feature data is compared with reference feature data stored in the reference feature data store 760.

The derivation of the reference feature data will now be described.

One example of this process is shown schematically in steps 980 and 990 of FIG. 19, in that images are analysed and reference feature data is derived. As regards which images should be analysed, first it is appropriate to consider the purpose of the reference feature data. The intention is that the reference feature data is generically indicative of image segments representing a certain type of product. An example is that reference feature data which should (ideally) compare well with feature data for the segment 800 would be indicative of automobiles in general, or saloon automobiles in particular, or even a certain colour or style of saloon automobiles. Accordingly, one way to generate the reference feature data for such an instance is to analyse (segment and derive feature data from) one or more images representing such a class of products. It may be that more generic results can be obtained by averaging the results from an analysis of plural such images. An alternative way is to generate the reference feature data analytically, i.e. by deciding what are the likely image properties of a segment relating to a part of an automobile, and then establishing what feature data such properties would represent. In general, multiple examples of reference feature data, each associated with a respective product or service type, are held by the reference feature data store 760.

In either case, a correspondence between the detected feature data of the image segment selected by the user and an instance of the reference feature data is detected by the comparison logic 750 at the step 950. Here, the best match could be selected, or a threshold "goodness of match" could be applied so that only matches of at least a certain statistical significance would be allowed, all using known matching techniques.

Where a match is found, a type of product or service (and possibly an internet address or hyperlink corresponding to that product) associated with the matching reference feature data is passed to the online shop. Either a shop portal, or a particular item or items for sale, or both, is passed to the client 700 at a step 960—in accordance with the targets of the hyperlink(s) mentioned above if they are used. Details of the shop and/or items (e.g. their identity and price) are displayed by the client (e.g. in a sub-window of a display screen) and—if desired—the user can execute a purchase (at a step 970) in the usual way—e.g. by operating (possibly with the pointing device) a purchase control such as a purchase menu item or control button.

The system could be administered by the online shop or by a third party. In either instance, the (or another) online shop provider can be invited to supply data in the form of images (or video) and associated hyperlinks or shopping information, optionally with associated reference feature data. This could be done in return for payment to the system administrator—either in advance, or in response to the user selection of an item relating to that shop (so-called "click through" payment), or when the user makes a purchase, or any combination of these.

It will be appreciated that these techniques need not be applied only to video images—a series of one or more still images could be used instead.

The invention claimed is:

1. An image processing method by a client device, comprising the steps of:
    partitioning an image under test to form a plurality of image segments, each segment representing a set of pixels having similar image properties;
    deriving feature data from a subset comprising one or more of the image segments;
    transmitting at least the feature data to a server device;
    receiving, from the server device, data indicative of a purchasable article or service associated with the reference feature data detected to be most similar to the feature data of one or more of the image segments; and
    displaying purchase details of the article or service.

2. The method according to claim 1, in which:
    the reference feature data is indicative of features of respective reference image segments;
    the reference image segments are respective images segments of one or more other images; and
    the comparing step is operable to detect a degree of similarity between the image under test and the one or more other images.

3. The method according to claim 1, in which at least some of the segments are contiguous.

4. The method according to claim 1, further comprising the steps of:
    accessing reference feature data indicative of a plurality of reference image segments, each reference image segment having an associated data item;
    detecting user selection of an image segment derived from the image under test;
    accessing the data item associated with the reference image data detected to be most similar to the image segment selected.

5. The method according to claim 4, in which:
    the associated data items are hyperlinks; and
    the step of accessing the associated data item comprises accessing the hyperlink target associated with that hyperlink.

6. The method according to claim 4, in which the step of accessing the associated data item comprises providing to the user data indicative of a purchase price of an article or service associated with that reference image segment.

7. The method according to claim 6, further comprising the step of:
    detecting user operation of a purchase control indicating that the user wishes to purchase the article or service.

8. The method according to claim 1, in which the feature data is indicative of at least colour properties.

9. The method according to claim 1, in which the feature data is indicative of at least image texture properties.

10. An image processing method by a server device, comprising the steps of:
receiving data from a client device indicative of feature data derived from a subset comprising one or more image segments of an image, each segment representing a set of pixels having similar image properties;
comparing the feature data from the subset of image segments with reference feature data so as to detect a degree of similarity between the feature data for the image segments under test and the reference feature data, in which the reference feature data or corresponding reference images have associated data items; and
transmitting, to the client device, data indicative a purchasable article or service associated with that reference feature data detected to be most similar to the feature data of one or more of the image segments.

11. An image processing method comprising the steps of:
by a client device:
partitioning an image under test to form a plurality of image segments, each segment representing a set of pixels having similar image properties;
deriving feature data from a subset comprising one or more of the image segments; and
transmitting at least the feature data to a server device, and
by the server device:
comparing the feature data from the subset of image segments with reference feature data so as to detect a degree of similarity between the feature data for the image segments under test and the reference feature data, in which the reference feature data or corresponding reference images have associated data items;
accessing the associated data item associated with the reference feature data detected to be most similar to the feature data of an image segment; and
providing to the client device data indicative of a purchase price of an article or service associated with that reference feature data detected to be most similar to the feature data of one or more of the image segments.

12. An image processing method comprising the steps of:
by a client device and a server device connected via an interface cooperating to:
partition an image under test to form a plurality of image segments, each segment representing a set of pixels having similar image properties;
derive feature data from a subset comprising one or more of the image segments;
compare the feature data from the subset of image segments with reference feature data so as to detect a degree of similarity between the feature data for the image segments under test and the reference feature data, in which the reference feature data or corresponding reference images have associated data items;
access the associated data item associated with the reference feature data detected to be most similar to the feature data of an image segment; and
display purchase details of an article or service associated with that reference feature data detected to be most similar to the feature data of one or more of the image segments.

13. An image processing apparatus comprising a processor configured to:
partition an image under test to form a plurality of image segments, each segment representing a set of pixels having similar image properties;
derive feature data from a subset comprising one or more of the image segments;
transmit at least the feature data to a server device;
receive, from the server device, data indicative of a purchasable article or service associated with the reference feature data detected to be most similar to the feature data of one or more of the image segments; and
display purchase details of the article or service.

14. The apparatus according to claim 13, further comprising a camera for capturing an image under test.

15. An image processing apparatus comprising:
a processor configured to:
receive data from a client device indicative of feature data derived from a subset comprising one or more image segments of an image, each segment representing a set of pixels having similar image properties;
compare the feature data from the subset of image segments with reference feature data so as to detect a degree of similarity between the feature data for the image segments under test and the reference feature data, in which the reference feature data or corresponding reference images have associated data items; and
transmit, to the client device, data indicative a purchasable article or service associated with that reference feature data detected to be most similar to the feature data of one or more of the image segments.

16. An image processing system comprising a client device and a server device,
the client device having a processor configured to:
partition an image under test to form a plurality of image segments, each segment representing a set of pixels having similar image properties;
derive feature data from a subset comprising one or more of the image segments; and
transmit at least the feature data to the server device, and
the server device having a processor configured to:
compare the feature data from the subset of image segments with reference feature data so as to detect a degree of similarity between the feature data for the image segments under test and the reference feature data, in which the reference feature data or corresponding reference images have associated data items;
access the associated data item associated with the reference feature data detected to be most similar to the feature data of an image segment; and
provide to the client device data indicative of a purchase price of an article or service associated with that reference feature data detected to be most similar to the feature data of one or more of the image segments.

17. An image processing system comprising a client device and a server device, each having a respective processor, the processors of the client device and the server device being configured to cooperate to:
partition an image under test to form a plurality of image segments, each segment representing a set of pixels having similar image properties;
derive feature data from a subset comprising one or more of the image segments;
compare the feature data from the subset of image segments with reference feature data so as to detect a degree of similarity between the feature data for the image segments under test and the reference feature data, in which the reference feature data or corresponding reference images have associated data items;
access the associated data item associated with the reference feature data detected to be most similar to the feature data of an image segment; and display purchase details of an article or service associated with that reference feature data detected to be most similar to the feature data of one or more of the image segments.

18. A non-transitory machine readable storage medium storing program code which, when executed by a client computer, causes the computer to:

partition an image under test to form a plurality of image segments, each segment representing a set of pixels having similar image properties;

derive feature data from a subset comprising one or more of the image segments;

transmit at least the feature data to a server device;

receive, from the server device, data indicative of a purchasable article or service associated with the reference feature data detected to be most similar to the feature data of one or more of the image segments; and display purchase details of the article or service.

19. A non-transitory machine readable storage medium storing program code which, when executed by a client and a server computer connected by an interface, causes the client computer and the server computer to cooperate to:

partition an image under test to form a plurality of image segments, each segment representing a set of pixels having similar image properties;

derive feature data from a subset comprising one or more of the image segments;

compare the feature data from the subset of image segments with reference feature data so as to detect a degree of similarity between the feature data for the image segments under test and the reference feature data, in which the reference feature data or corresponding reference images have associated data items;

access the associated data item associated with the reference feature data detected to be most similar to the feature data of an image segment; and display purchase details of an article or service associated with that reference feature data detected to be most similar to the feature data of one or more of the image segments.

* * * * *